United States Patent [19]

Yamamoto et al.

[11] Patent Number: 4,704,139

[45] Date of Patent: Nov. 3, 1987

[54] METHOD AND APPARATUS FOR SEPARATING GASES

[75] Inventors: Akio Yamamoto, Kudamatsu; Takazumi Ishizu, Hikari; Kiyoshi Ichihara, Kudamatsu, all of Japan

[73] Assignee: Hitachi, Ltd., Tokyo, Japan

[21] Appl. No.: 904,112

[22] Filed: Sep. 4, 1986

[30] Foreign Application Priority Data

Sep. 11, 1985 [JP] Japan ................... 60-199432

[51] Int. Cl.$^4$ .................. B01D 53/22; B03C 1/30
[52] U.S. Cl. ............................. 55/3; 55/6; 55/16; 55/100; 55/158
[58] Field of Search .............. 55/3, 6, 16, 100, 158; 210/222, 223

[56] References Cited

U.S. PATENT DOCUMENTS

| 1,056,026 | 3/1913 | Hoofnagle | 55/6 X |
| 1,364,136 | 1/1921 | Palmer | 55/3 X |
| 1,546,632 | 7/1925 | Dow et al. | 55/3 |
| 2,966,235 | 12/1960 | Kammermeyer | 55/16 |
| 3,059,110 | 10/1962 | Japolsky | 55/3 X |
| 3,510,387 | 5/1970 | Robb | 55/16 X |
| 3,830,621 | 8/1974 | Miller | 55/3 X |
| 3,876,957 | 4/1975 | Thatcher | 55/16 X |
| 4,049,398 | 9/1977 | Vaseen | 55/3 |
| 4,167,480 | 9/1979 | Mach | 210/223 X |
| 4,354,857 | 10/1982 | Reiss | 55/6 |

FOREIGN PATENT DOCUMENTS

| 1910574 | 9/1970 | Fed. Rep. of Germany | 55/100 |
| 1324356 | 3/1963 | France | 55/16 |
| 350 | 1/1979 | Japan | 55/100 |
| 47890 | 4/1979 | Japan | 55/100 |
| 124526 | 9/1980 | Japan | 55/16 |
| 14808 | 3/1983 | Japan | . |
| 169521 | 9/1984 | Japan | . |
| 49044 | 11/1984 | Japan | . |
| 46903 | 3/1985 | Japan | 55/100 |

*Primary Examiner*—Robert Spitzer
*Attorney, Agent, or Firm*—Antonelli, Terry & Wands

[57] ABSTRACT

A method of separating gases which includes: a step which introduces into a separating cell a mixture gas that contains paramagnetic gases and nonparamagnetic gases, and which separates the paramagnetic gases and the nonparamagnetic gases from the mixture gas via a permeable membrane in the separating cell; and a step which applies a magnetic field to a gas stream of the mixture gas nearly at right angles therewith to form a high gradient magnetic field region, so that the paramagnetic gases and the nonparamagnetic gases are separated from the mixture gas by the high gradient magnetic field. An apparatus for separating gases which includes: a separating cell having a permeable membrane arranged inside thereof; and a magnetic field generating device which applies a magnetic field nearly at right angles to a gas stream of a mixture gas that passes through the permeable membrane in the separating cell and that contains paramagnetic gases and nonparamagnetic gases, so that a high gradient magnetic field region is formed near a magnetic support member that corresponds to the permeable membrane. By utilizing the separation by membrane and the separation by a high gradient magnetic field in combination, the paramagnetic gases and nonparamagnetic gases are separated from the mixture gas efficiently and in large amounts.

10 Claims, 16 Drawing Figures

METHOD AND APPARATUS FOR SEPARATING GASES

BACKGROUND OF THE INVENTION

1. Field of the Invention

The present invention relates to a method and apparatus for separating gases, and more specifically to a method and apparatus for separating gases, that are adapted to separating paramagnetic gases and nonparamagnetic gases from a mixture gas such as the air or the like.

2. Description of the Prior Art

Techniques for separating paramagnetic gases and nonparamagnetic gases from a mixture gas have been known as taught, for example, in Japanese Patent Publication No. 14808/1983 and Japanese Patent Laid-Open No. 169521/1984. Such conventional techniques are to produce the oxygen-enriched air by utilizing a permeable membrane.

According to the above conventional techniques, the degree of concentration is 25 to 30% at the greatest in terms of oxygen concentration being determined by the properties (permeability) of the permeable membrane, selective permeability thereof, strength of the permeable membrane for the pressure difference in front of, and at the back of, the permeable membrane, and the specific productivity of the electric power. Moreover, the amount of permeation is not so large, i.e., the amount of separation is not so large, and the above-mentioned technique is used within a limited range of applications.

In addition to the above-mentioned techniques, another technique for separating paramagnetic gases and nonparamagnetic gases from a mixture gas has also been known as taught, for example, in Japanese Patent Publication No. 49044/1983. According to the above technique, paramagnetic particles contained in a fluid to be treated are captured and separated by utilizing a magnetic field. Namely, a path of the fluid to be treated is formed in space between the ends of the opposing yokes, a magnetic filter is inserted in the path between the ends, the magnetic filter being obtained by superposing a plurality of wire gauzes that are obtained by weaving ferromagnetic fine wires, and being arranged at right angles with the magnetic field that acts upon the path of the fluid to be treated, the magnetic field being produced by exciting coils wound on the yokes, such that the magnetic field meets at right angles with the direction in which the fluid to be treated flows.

With such a conventional technique, however, it is not possible to continuously separate the paramagnetic gases and the nonparamagnetic gases from the mixture gas. In particular, the paramagnetic gases are captured by the magnetic filter; i.e., it is difficult to take out the thus captured paramagnetic gases.

Summary of the Invention

The object of the present invention is to provide a method and an apparatus for separating gases, that are capable of separating paramagnetic gases and nonparamagnetic gases from a mixture gas efficiently and in large amounts.

Namely, the present invention deals with a method of separating gases comprising: a step which introduces into a separating cell a mixture gas that contains paramagnetic gases and nonparamagnetic gases, and which separates said paramagnetic gases and said nonparamagnetic gases from said mixture gas via a permeable membrane in said separating cell; and a step which applies a magnetic field to a gas stream nearly at right angles therewith to form a magnetic field region of a high gradient, so that said paramagnetic gases and said nonparamagnetic gases are separated from said mixture gas by said magnetic field of the high gradient.

The invention further deals with an apparatus for separating gases comprising: a separating cell having a permeable membrane arranged inside thereof; and a magnetic field generating device which applies a magnetic field nearly at right angles to a gas stream that passes through the permeable membrane in the separating cell, so that a magnetic field region of a high gradient is formed near a magnetic support member that corresponds to the permeable membrane.

According to the present invention which utilizes the separation by membrane and the separation by magnetic field of a high gradient in combination, the paramagnetic gases and the nonparamagnetic gases are separated from a mixture gas efficiently and in large amounts.

DESCRIPTION OF THE PREFERRED EMBODIMENTS

A representative example of the mixture gas is air, a representative example of the paramagnetic gas is oxygen ($O_2$) and a representative example of the nonparamagnetic gas is nitrogen ($N_2$).

When a magnetic field is applied to the air (oxygen concentration of 21%), a relationship between the magnetic field intensity and the oxygen concentration is given as described below. Namely, in a magnetic field H established by a magnet (electromagnet) shown in FIG. 11, oxygen is concentrated in accordance with the following equation (1), $$C_0 = C_1 \cdot \exp\left\{ (2.43 \times 10^{-5}) \cdot \frac{H^2}{PT} \right\} \quad (1)$$

where $C_1$ denotes an initial concentration of oxygen (%),

P denotes a pressure (dyne/cm$^2$),

H denotes a magnetic field intensity (Oe), and

T denotes an absolute temperature (°K.).

Figure 12:
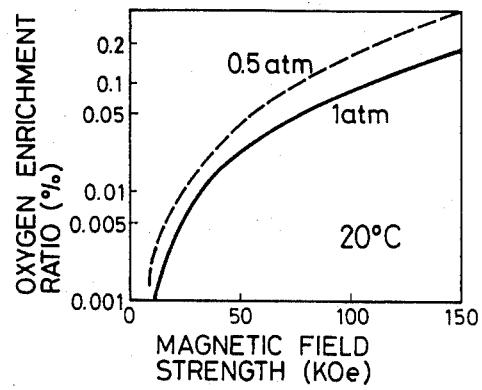
Figure 13:
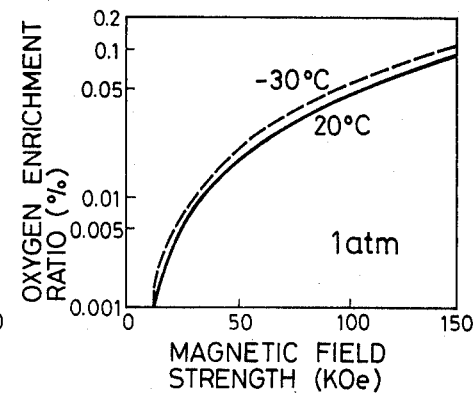

If calculated in compliance with the equation (1) under the conditions of a maximum field intensity of an electromagnet (superconducting magnet) of about 150 (KOe), a pressure of 1 atm ($1.013 \times 10^6$ dyne/cm$^2$) using membrane separation in combination, and a temperature of 20° C. (293° K.), the oxygen concentration becomes 21.02%, indicating that oxygen is condensed by 0.1%. FIGS. 12 and 13 illustrate the calculated results.

Figure 11:
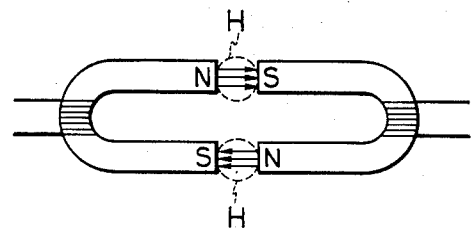
FIGS. 11 to 16 are diagrams which illustrate the present invention.

Namely, with the method shown in FIG. 11, oxygen is condensed by about 0.1 to 0.2% at the greatest. In effect, this method is not helpful to efficiently separate oxygen and nitrogen from the air.

Figure 14:
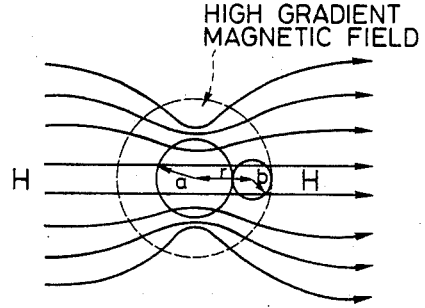

When the high gradient magnetic separation is utilized, oxygen is concentrated as described below. That is, when a magnetic field of a field intensity of H is applied to a fine magnetic wire having a radius α as shown in FIG. 14, the force F that acts upon a fine magnetic particle having a diameter b is given by the following equation, $$F = \frac{8}{3} \pi b^3 \left(1 + \frac{a^2}{\gamma^2}\right) \frac{a^2}{\gamma^3} \times H_2 \quad (2)$$

where X denotes a susceptibility (cgsemu) of a magnetic particle.

Therefore, oxygen which consists of magnetic fine particles is attracted into the high gradient magnetic field and is strikingly concentrated.

In the case of a fine magnetic line, the high gradient magnetic field occupies a very small region. When the magnetic field is applied to steel wool or wire gauze, however, the magnetic flux is further concentrated and the high gradient magnetic field is expanded.

Figure 15:
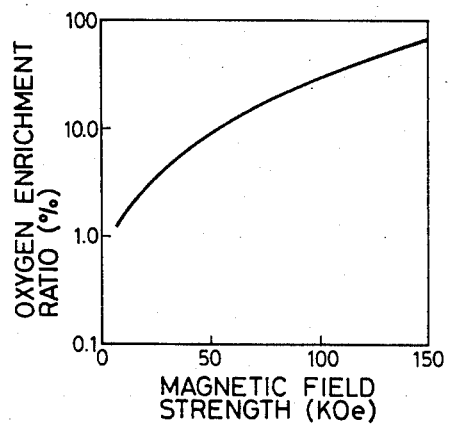
Figure 16:
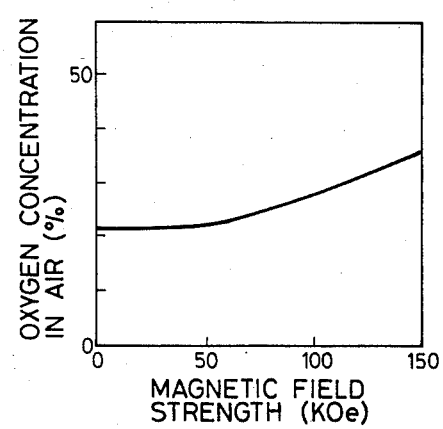

Here, if calculated in accordance with the equations (1) and (2) under the conditions of using a steel wool having a diameter of 0.01 μm, a pressure of 1 atm, a temperature of 20° C., and a magnetic field intensity of 150 KOe, the oxygen concentration becomes 36.5%, which is an oxygen condensation of 74%. Calculated results of this case are shown in FIGS. 15 and 16. By forming the high gradient magnetic field region, as described above, the oxygen concentration in the air can be increased to 30 to 40%. However, the oxygen concentration does not increase any more no matter how the gradient of the magnetic field region is increased. To further increase the oxygen concentration is not practical from the standpoint of manufacturing cost and the cost of installation.

According to the present invention, therefore, the separation by membrane and the separation by high gradient magnetic field are used in combination in order to realize an innovative gas separation (for example, to separate oxygen and nitrogen). It is desired to use a superconducting magnet to generate an intense magnetic field.

The invention will now be described by way of concrete embodiments.

Figure 1:
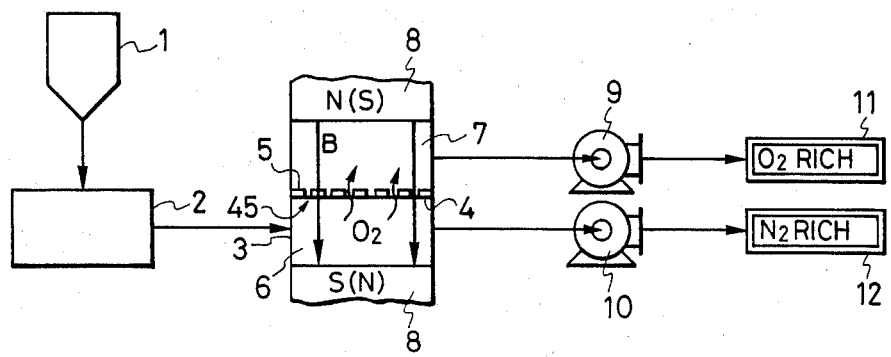
FIG. 1 is a diagram illustrating the flow according to an embodiment of the present invention.

FIG. 1 is a flow sheet according to an embodiment of the present invention. The air 1 is cleaned and is dried through a filter and a desiccator 2, and is supplied into a separating cell 3. The air 1 is supplied by a suction fan 10, and an average flow speed in the cell 3 is maintained to be smaller than 3 cm/sec (so that the new air flows at all times near the surface of the permeable membrane 4). The air 1 that is supplied comes into contact with the permeable membrane 4 in the cell 3. The permeable membrane 4 is composed of a high molecular material and is, preferably, composed of a silicone polymer, and has a very reduced thickness. Thickness of the silicone polymer and particularly the siloxane polymer can be reduced to 0.05μ. The air 1 which has come into contact with the permeable membrane 4 partly migrates toward a path 7 of the low pressure side via the permeable membrane 4 in the form of oxygen-enriched air 11 in which oxygen is concentrated, owing to a pressure differential between a path 6 of the high pressure side in which the air 1 flows and the path 7 of the low pressure side where the pressure is reduced by a vacuum pump (or by a suction blower) 9. Here, the permeable membrane 4 is adhered or contacted onto a support member 5 so that it withstands the pressure differential between the path 6 of the high pressure side and the path 7 of the low pressure side, and so that it can be easily handled. The permeable membrane 4 is located in the path 6 of the high pressure side on the support member 5. The support member 5 is made up of a magnetic material, and particularly of a wire gauze or a woven product of fine steel wires. To the support member 5 is perpendicularly applied a magnetic field by a magnetic field generator 8 and, particularly, by a superconducting magnet, so that a high gradient magnetic field region is established around the support member 5. The unit made up of the permeable membrane 4 and the support member 5 is hereinafter referred to as a permeable membrane 45 with a magnetic support member. Therefore, oxygen in the air 1 on the high pressure side 6 where the flow speed is small, is enriched near the surface of the permeable membrane 4 in the high gradient magnetic field region owing to the magnetization. The oxygen partial pressure increases near the permeable membrane, and the amount of permeation increases by 50% in terms of the oxygen concentration compared with that of the separation by membrane alone, and the amount of oxygen increases by 1.8 times. Thus, the oxygen-enriched air 11 is obtained in the path 7 of the low pressure side. In this case, the support member 5 is composed of a steel wool the wires thereof having a diameter of 0.01 μm, the magnetic field is 150 KOe, the pressure is 1 atm on the high pressure side 6 and is 0.2 atm on the low pressure side 7.

Figure 2:
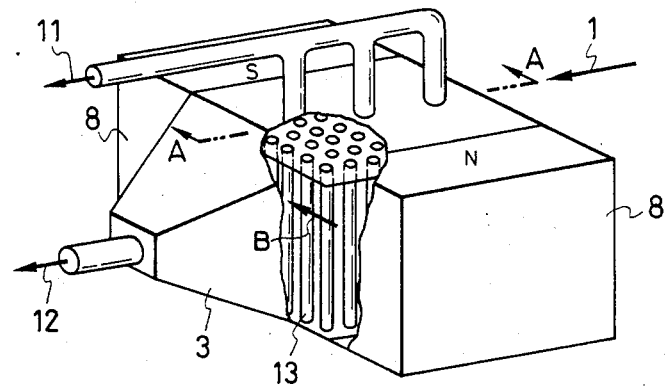
FIGS. 2 to 4 are diagrams illustrating major portions according to the embodiment of the present invention.
Figure 3:
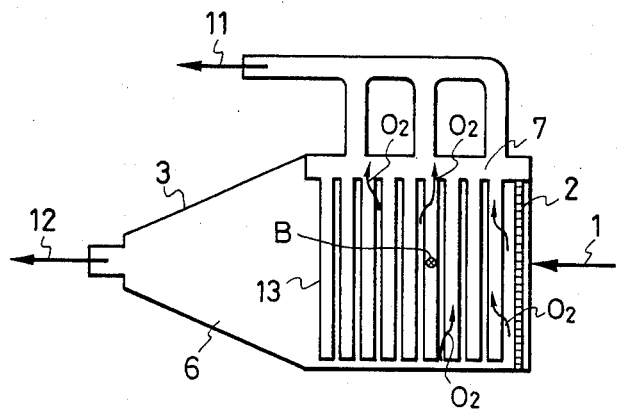
Figure 4:
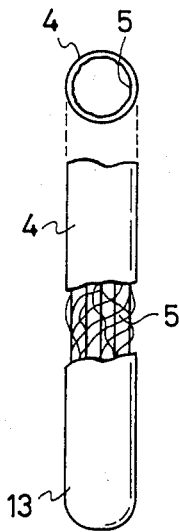

FIGS. 2 to 4 illustrate the separating cell 3 of FIG. 1. As shown in FIG. 4, cylinders 13 are arranged in many number in the separating cell 3 in such a manner that the flow of the air 1 is not disturbed, each cylinder 13 having a permeable membrane 4 adhered onto the support member 5 that is made of a steel, or a wire gauze, or a woven product. The cylinders 13 divide the cell 3 into the path 6 of the high pressure side and the path 7 of the low pressure side. The path 6 of the high pressure side is so adjusted by the suction fan 10 that the pressure is equal to the atmospheric pressure and the flow speed of the air 1 is lower than 3 cm/sec. On the other hand, the path 7 of the low pressure side is so adjusted by the vacuum pump or the suction blower 9 that the pressure therein is about 0.2 atm. Next, the magnetic field generator 8 is so installed as to apply a magnetic field to the cylinders 13 perpendicularly thereto. Here, the intensity of the magnetic field should be greater than 50 KOe.

Next, another embodiment of the present invention will be described in conjunction with FIGS. 5 to 8.

Figure 5:
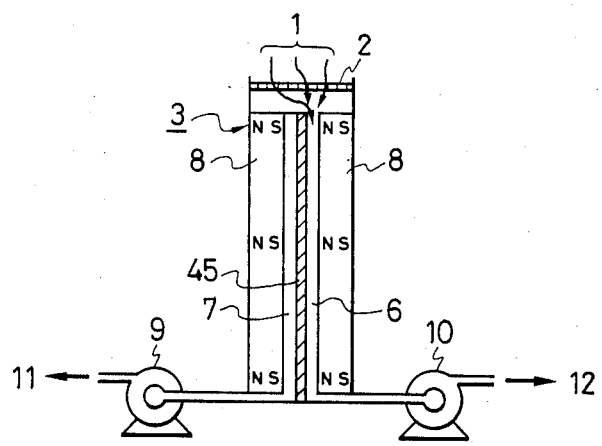
FIGS. 5 to 8 are diagrams illustrating another embodiment of the present invention.
Figure 7:
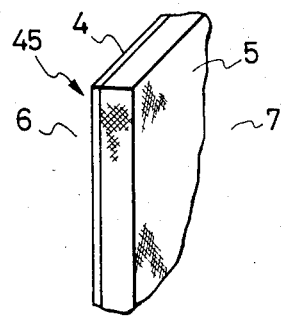

FIG. 5 shows a basic idea of this embodiment. The separating cell 3 is divided into the path 6 of the high pressure side and the path 7 of the low pressure side by the permeable membrane 4 on the support member 5. Here, the permeable membrane 4 is disposed in the path 6 of the high pressure side on the support member 5 as shown in FIG. 7. The support member 5 is composed of a magnetic material and, particularly a wire gauze or a woven product of fine steel wires. A steel wire has a diameter smaller than 1 μ, and is placed at right angles with the direction of magnetic field generated by the magnetic field generator 8. The gap (thickness) between the path 6 of the high pressure side and the path 7 of the low pressure side should be reduced as small as possible. In practice, the gap should be several millimeters or smaller. A magnetic field generator 8 is installed in the path 6 of the high pressure side and in the path 7 of the low pressure side of the separating cell 3, so that the magnetic field passes through the separating cell 3. In the case of this embodiment, it is recommended to use a superconducting magnet as the magnetic field generator even from the standpoint of running cost, and the intensity of magnetic field should be greater than 50 KOe.

The air 1 cleaned through the filter 2 flows through the path 6 of the high pressure side in the separating cell 3 at a flow speed of smaller than 3 cm/sec, and is emitted out of the cell 3 by the suction fan 10. During this period, oxygen in the air 1 in the path 6 of the high pressure side is attracted by the high gradient magnetic field of the support member 5 magnetized by the magnetic field that is generated by the magnetic field generator 8, and further selectively migrates into the path 7 of the low pressure side through the permeable membrane 4. The oxygen-enriched air in the path 7 of the low-pressure side is supplied to the next step by the vacuum pump or the suction blower 9.

Figure 6:
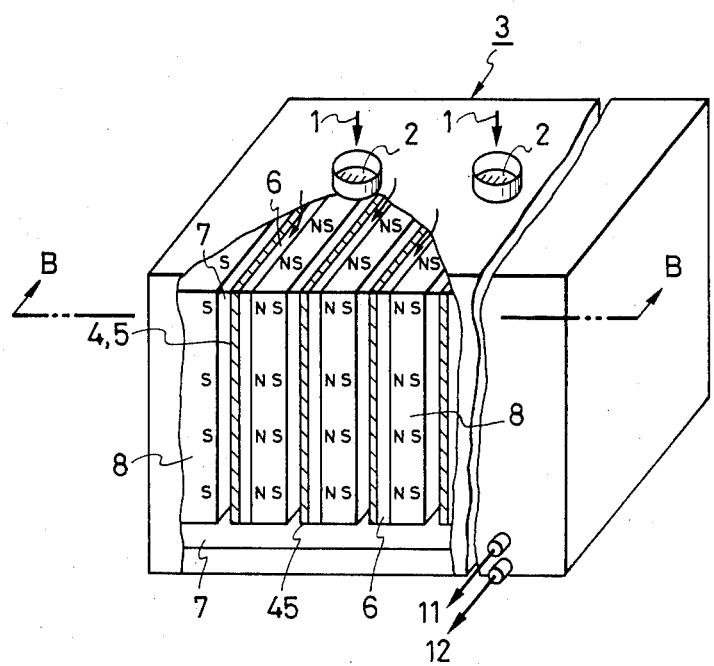
Figure 8:
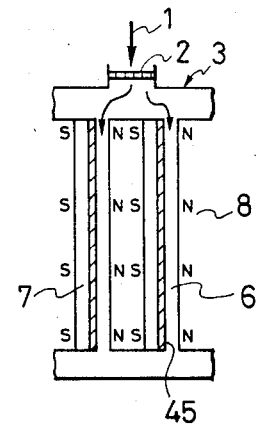

FIG. 6 shows this unit constructed on a large scale, i.e., which consists of a laminate of units of FIG. 5. FIG. 8 is a section view of the multi-layer unit.

A further embodiment of the present invention will now be described in conjunction with FIGS. 9 and 10.

A magnetic field generated by a magnet usually decreases as the distance increases between the pole and the pole (varies in reverse proportion to the square power of the distance). When a magnetic material exists in the magnetic field, however, most of the magnetic flux passes through the magnetic material, and the magnetic field is not almost weakened. FIG. 9 illustrates an embodiment which utilizes this principle.

Figure 10:
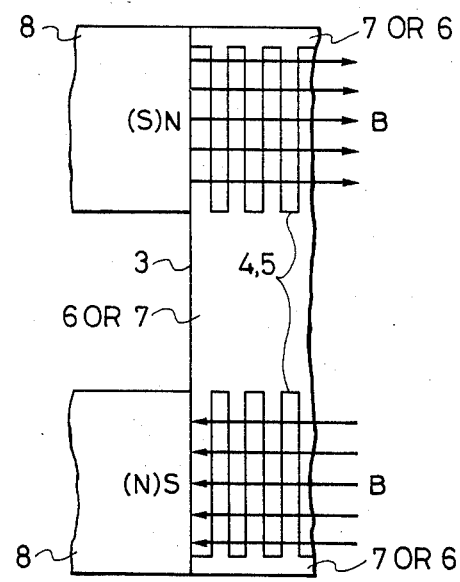

Referring to FIG. 10, permeable membranes 4 placed on the support members 5 are arranged in a plurality of layers maintaining a gap of several millimeters or less in a magnetic field established by the magnetic field generators 8. The permeable membranes 4 are continuously formed (the upper permeable membrane 4 is different from the lower permeable membrane 4), and divide the separating cell 3 into the path 6 of the high pressure side and the path 7 of the low pressure side. Further, the air and the oxygen-enriched air flow in the directions at right angles with the surface of the paper in the form of counter-stream or parallel stream.

Figure 9:
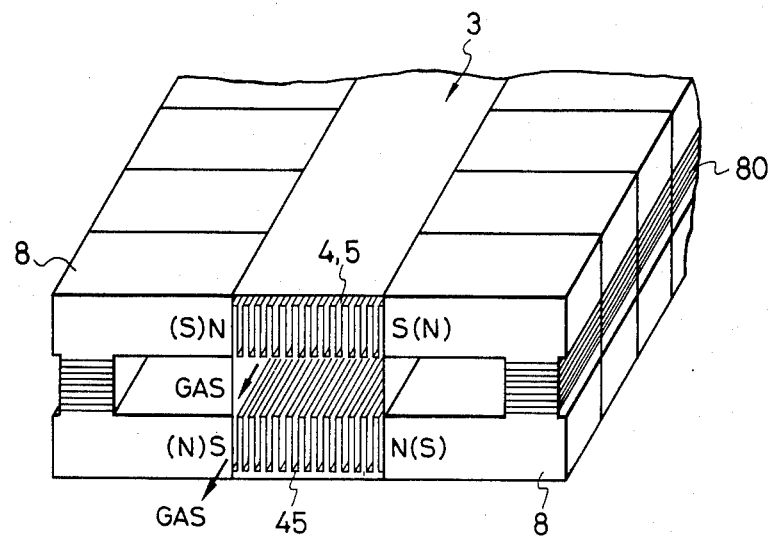
FIGS. 9 and 10 are diagrams illustrating a further embodiment of the present invention.

FIG. 9 concretely illustrates the structure of Fig. 10. In FIG. 9, reference numeral 80 denotes a coil which generates a magnetic field when an electric current is permitted to flow therethrough.

In the above-mentioned embodiments, the device is constructed in a single stage. However, the concentration of oxygen can be further increased if the device is constructed in a plurality of stages. That is, if the devices are connected in a plurality of stages in cascade, the oxygen concentration can be increased to a desired level.

The above embodiments have dealt with the cases where oxygen and nitrogen are separated from the air. The invention, however, is not limited thereto but can also be utilized for separating paramagnetic gases and nonparamagnetic gases from the mixture gases. Moreover, the term "mixture gases" includes not only those which are gasified but also those which are liquefied. The invention can be rather efficiently and practically employed when a mixture gas liquefied at low temperatures is to be separated.

As described above, the present invention deals with a method of separating gases comprising: a step which introduces into a separating cell a mixture gas that contains paramagnetic gases and nonparamagnetic gases, and which separates the paramagnetic gases and the nonparamagnetic gases from the mixture gas via a gas permeable membrane in the separating cell; and a step which applies a magnetic field to a gas stream nearly at right angles therewith to form a high gradient magnetic field region, so that the paramagnetic gases and the nonparamagnetic gases are separated from the mixture gases by the high gradient magnetic field.

The invention further deals with an apparatus for separating gases comprising: a separating cell having a permeable membrane arranged inside thereof; and a magnetic field generating device which applies a magnetic field nearly at right angles to a gas stream that passes through the permeable membrane in the separating cell, so that a high gradient magnetic field region is formed near a magnetic support member that corresponds to the permeable membrane.

According to the present invention which utilizes the separation by membrane and the separation by the high gradient magnetic field in combination, the paramagnetic gases and the nonparamagnetic gases are separated from a mixture gas efficiently and in large amounts.

What is claimed is:

1. A method of separating gases comprising: a step which introduces into a separating cell a mixture gas that contains paramagnetic gases and nonparamagnetic gases, and which separates said paramagnetic gases and said nonparamagnetic gases from said mixture gas via a permeable membrane in said separating cell; and a step which applies a magnetic field to a gas stream of said mixture gas nearly at right angles therewith to form a high gradient magnetic field region, so that said paramagnetic gases and said nonparamagnetic gases are separated from said mixture gas by the high gradient magnetic field.

2. A method of separating gases according to claim 1, wherein said high gradient magnetic field region includes said permeable membrane.

3. A method of separating gases according to claim 1, wherein said mixture gas is air, and oxygen and nitrogen are separated from said air to concentrate said oxygen.

4. A method of separating gases according to claim 3, wherein said oxygen in said air is concentrated near the surface of said permeable membrane by said high gradient magnetic field.

5. An apparatus for separating gases comprising: a separating cell having a permeable membrane arranged inside thereof; and a magnetic field generating device which applies a magnetic field nearly at right angles to a gas stream of a mixture gas that passes through the permeable membrane in said separating cell and that contains paramagnetic gases and nonparamagnetic gases, so that a high gradient magnetic field region is formed near a magnetic support member that corresponds to said permeable membrane.

6. An apparatus for separating gases according to claim 5, wherein said magnetic support member is arranged at right angles with the direction of said magnetic field.

7. An apparatus for separating gases according to claim 6, wherein said magnetic support member is composed of a steel wool or a wire gauze.

8. An apparatus for separating gases comprising: a plurality of elements which consist of a magnetic support member and a permeable membrane provided on said magnetic support member, said plurality of elements being arranged in a separating cell in a direction at right angles with the stream of a mixture gas that flows in said separating cell, so as to divide said separating cell into a path of the high pressure side and a path of the low pressure side; and a magnetic field generator which generates a magnetic field in a direction at right angles with the stream of said mixture gas and at right angles with the direction in which said elements are arranged.

9. An apparatus for separating gases wherein a unit comprises a magnetic support member, a permeable membrane placed on said magnetic support member, and a magnetic field generating device that applies a magnetic field to said magnetic support member at right angles therewith, said magnetic support member forming a high-pressure path on the side of said permeable membrane and a low-pressure path on the side of said magnetic support member, and wherein said units are provided in a plurality of number in a separating cell, the high-pressure paths thereof being communicated with space into which a mixture gas is introduced.

10. An apparatus for separating gases wherein permeable membranes placed on magnetic support members are continuously formed in a plurality of layers to divide a separating cell into a path of the high pressure side and a path of the low pressure side, and space communicated said path of the low pressure side is formed among said neighboring permeable membranes, and wherein provision is made of a magnetic field generating device to apply a magnetic field to said magnetic support members at right angles therewith.

* * * * *